(12) United States Patent
Pionetti

(10) Patent No.: US 7,722,085 B2
(45) Date of Patent: May 25, 2010

(54) UNDERSEA PIPE INCLUDING AN INTERNAL LINER

(75) Inventor: François-Régis Pionetti, La Baleine (FR)

(73) Assignee: Saipem S.A., Montigny le Bretonneux (FR)

( * ) Notice: Subject to any disclaimer, the term of this patent is extended or adjusted under 35 U.S.C. 154(b) by 625 days.

(21) Appl. No.: 11/665,672

(22) PCT Filed: Sep. 28, 2005

(86) PCT No.: PCT/FR2005/002395

§ 371 (c)(1),
(2), (4) Date: Apr. 18, 2007

(87) PCT Pub. No.: WO2006/042925

PCT Pub. Date: Apr. 27, 2006

(65) Prior Publication Data

US 2007/0284872 A1    Dec. 13, 2007

(30) Foreign Application Priority Data

Oct. 19, 2004    (FR)    ................. 04 11055

(51) Int. Cl.
*F16L 9/14* (2006.01)
(52) U.S. Cl. ..................... 285/55; 285/288.1
(58) Field of Classification Search .......... 285/55, 285/288.1, 288.2, 288.3, 288.4, 370
See application file for complete search history.

(56) References Cited

U.S. PATENT DOCUMENTS

| | | | | | |
|---|---|---|---|---|---|
| 4,357,745 | A | * | 11/1982 | Chlebowski | 285/55 |
| 4,400,019 | A | * | 8/1983 | Fruck | 285/55 |
| 4,611,833 | A | * | 9/1986 | Lescaut | 285/55 |
| 4,913,465 | A | * | 4/1990 | Abbema et al. | 285/288.1 |
| 5,104,152 | A | * | 4/1992 | Galfant | 285/55 |
| 5,346,261 | A | * | 9/1994 | Abbema | 285/55 |
| 5,348,211 | A | * | 9/1994 | White et al. | 228/120 |
| 5,368,669 | A | * | 11/1994 | Maine et al. | 285/55 |
| 5,566,984 | A | * | 10/1996 | Abbema et al. | 285/55 |
| 5,634,672 | A | * | 6/1997 | Stack et al. | 285/55 |
| 5,988,691 | A | * | 11/1999 | Cruickshank | 285/55 |
| 5,992,897 | A | * | 11/1999 | Hill et al. | 285/55 |
| 6,226,855 | B1 | * | 5/2001 | Maine | 285/55 |
| 6,375,226 | B1 | * | 4/2002 | Dickinson et al. | 285/55 |

(Continued)

FOREIGN PATENT DOCUMENTS

EP    0722824    7/1996

(Continued)

*Primary Examiner*—David E Bochna
(74) *Attorney, Agent, or Firm*—Cohen Pontani Lieberman & Pavane LLP

(57) ABSTRACT

A pipe (1) comprising at least two pipe elements ($1_1$, $1_2$) having internal liners of plastic material (2), the pipe elements being assembled end to end, in which the ends of the two pipe elements are welded (5) together and in which the ends of the internal liners (2) of plastic material of each of the pipe elements are joined together by a tubular junction sleeve (3) of material that withstands corrosion and that co-operate with the ends (2a, 2b) of the liners by mutual engagement via a notched surface ($3_2$), said liner ends (2) presenting reduced thickness (2a, 2b) and being bonded against the steel wall of said pipe by adhesive (4a, 4b).

17 Claims, 8 Drawing Sheets

U.S. PATENT DOCUMENTS 7,360,797 B2 * 4/2008 Posson .................. 285/55
7,431,341 B2 * 10/2008 McIntyre .................. 285/53

FOREIGN PATENT DOCUMENTS

| GB | 2218488 | 11/1989 |
| GB | 2298256 | 8/1996 |
| WO | WO 2004/011840 | 2/2004 |
| WO | WO 2004/015321 | 2/2004 |

\* cited by examiner

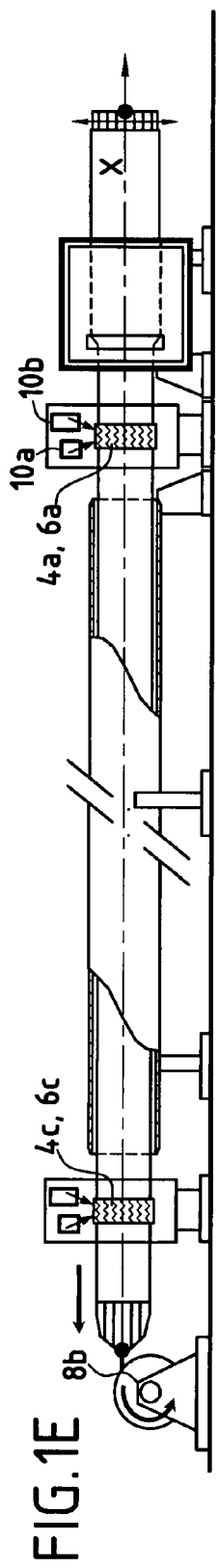
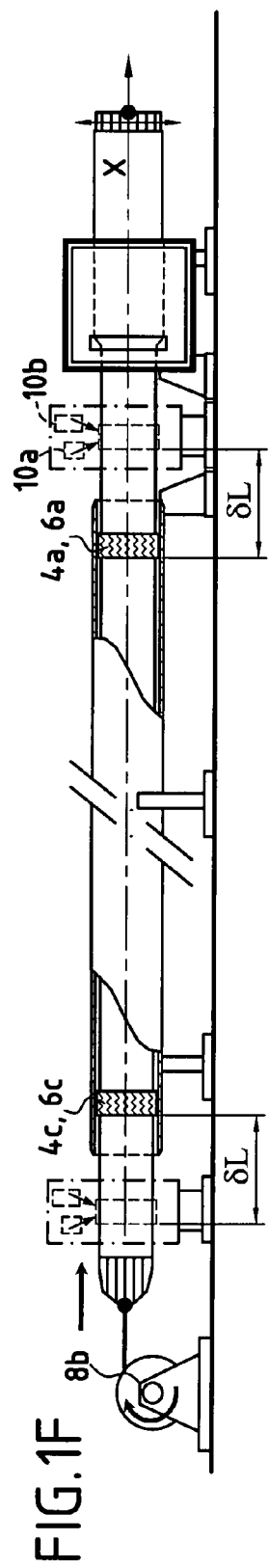
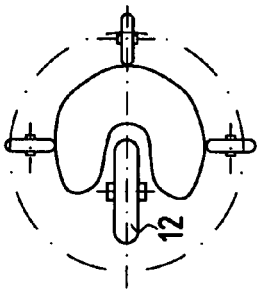
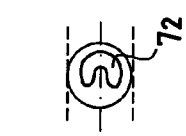
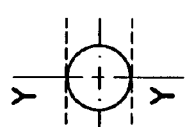
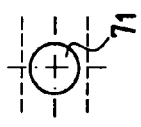

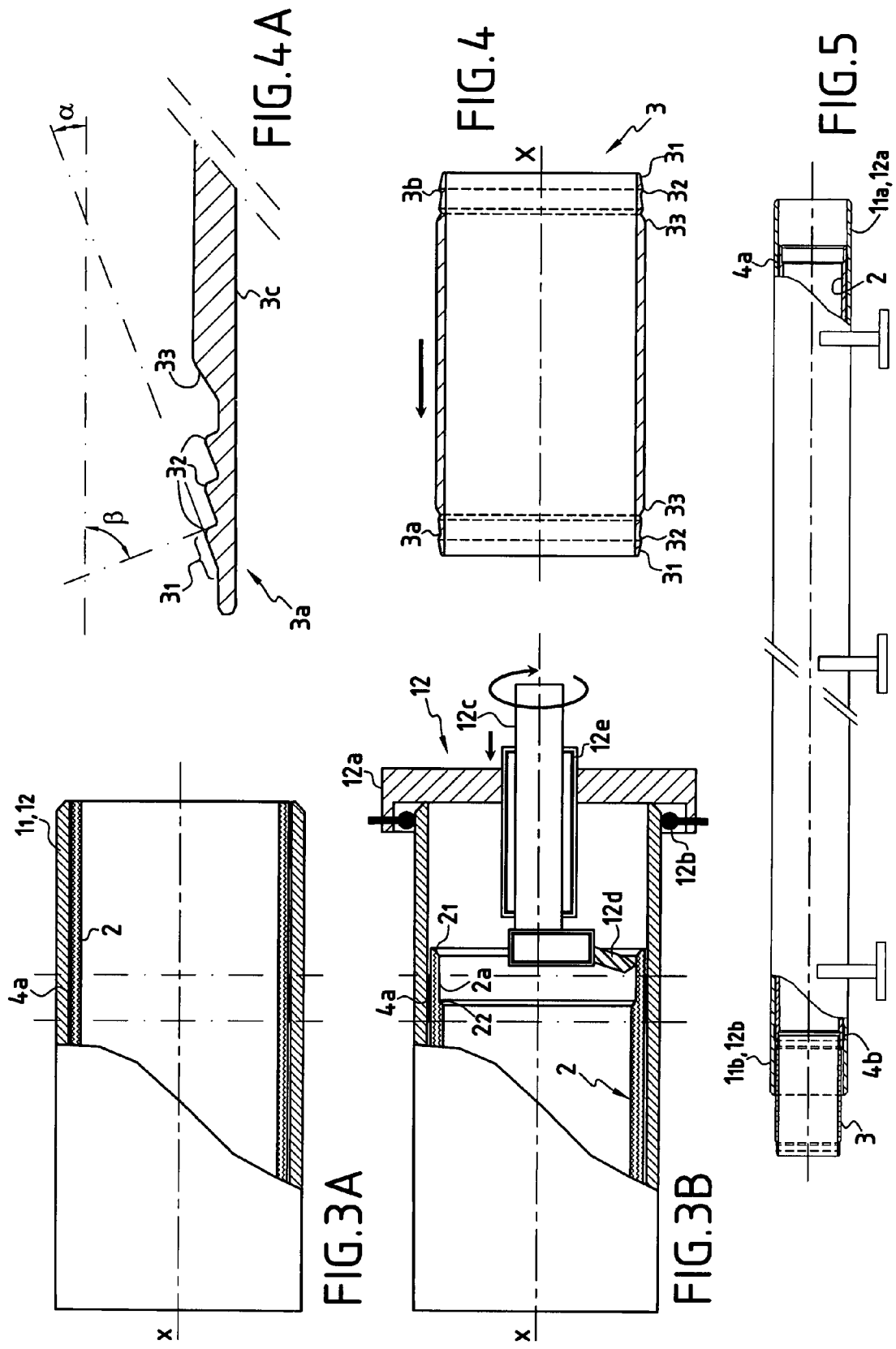

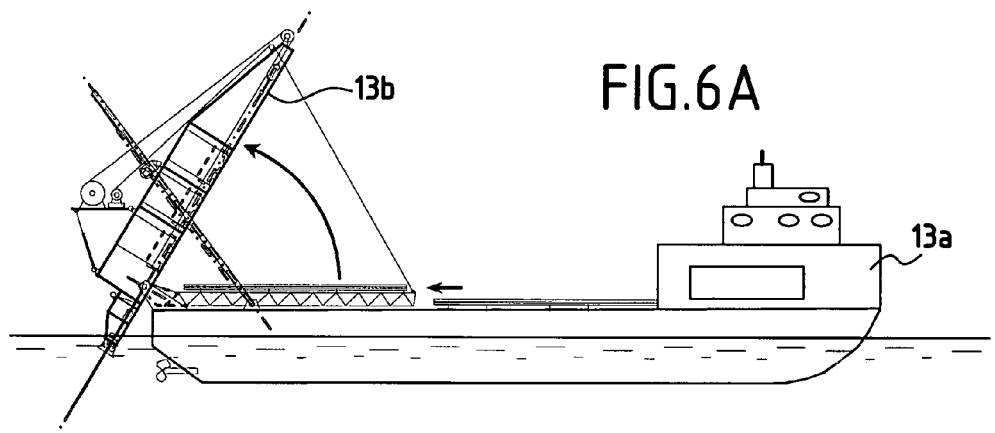
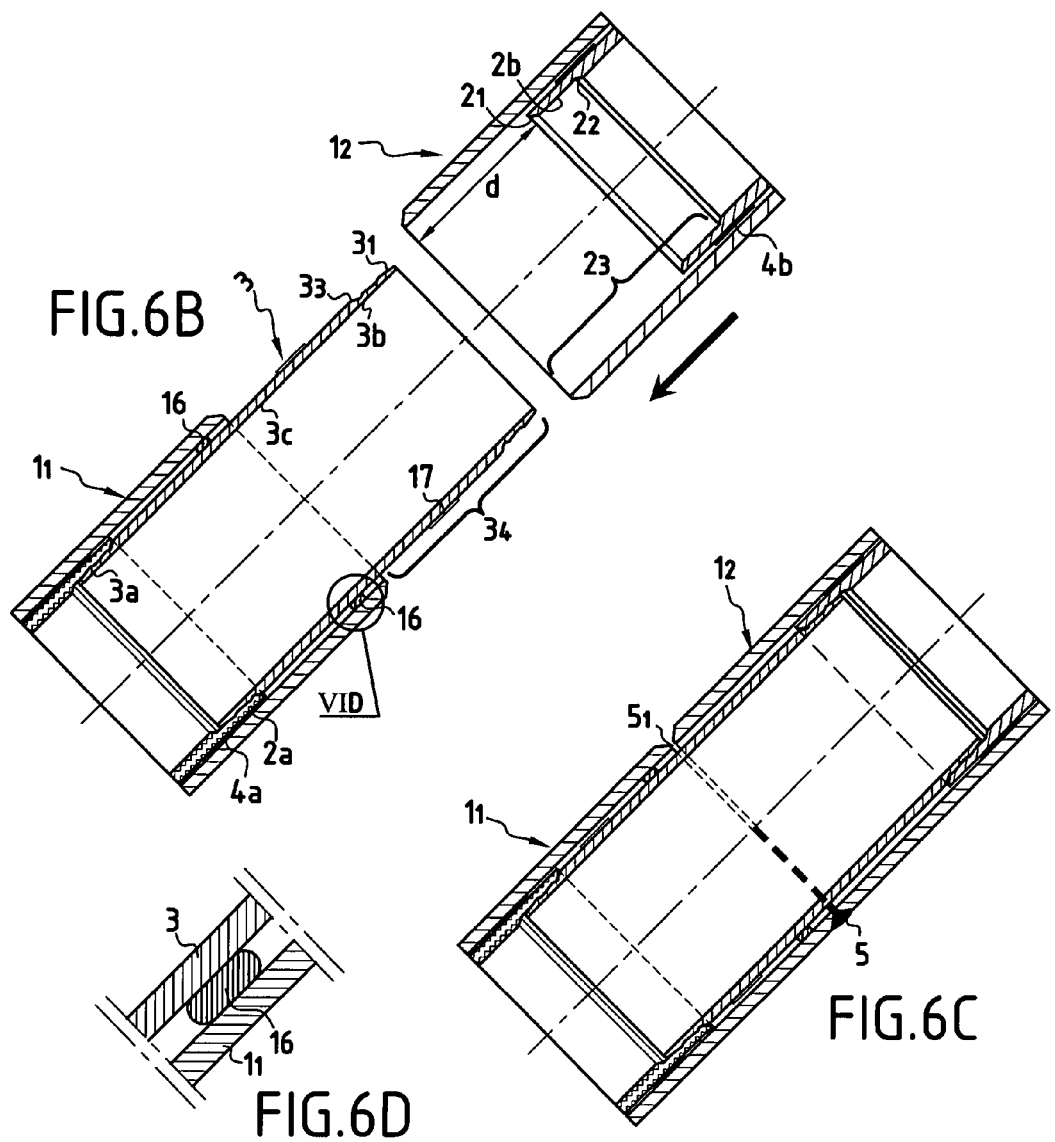

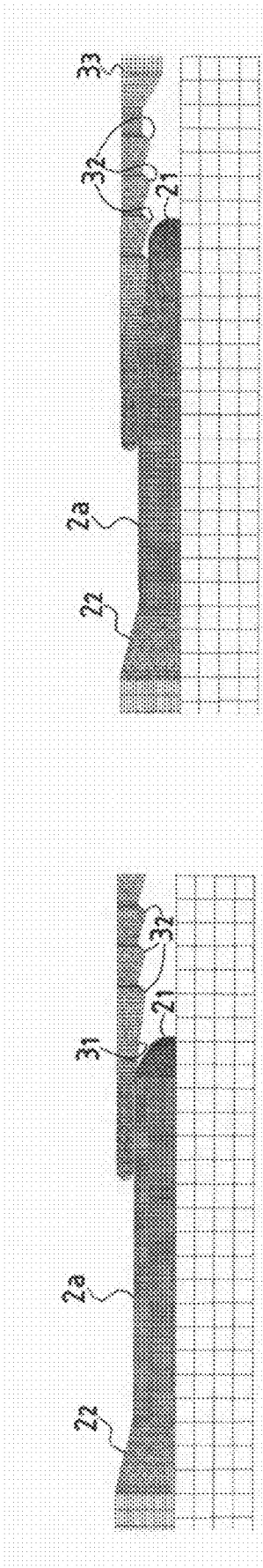
FIG.8A
FIG.8B
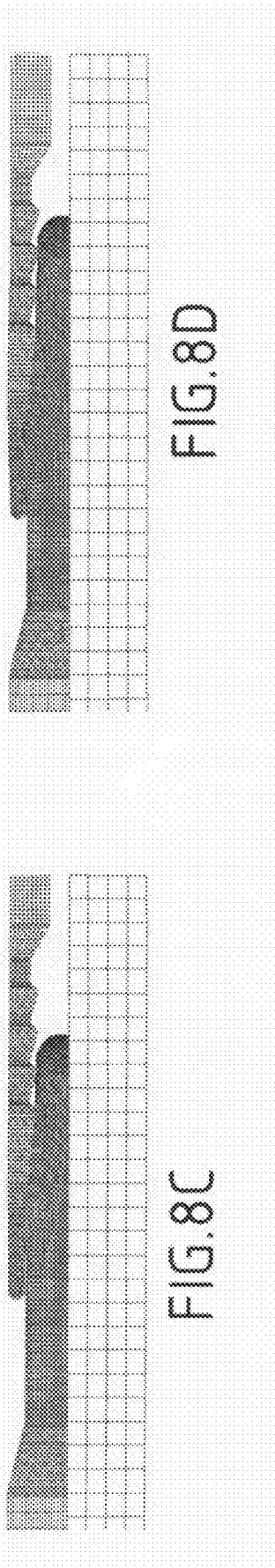
FIG.8C
FIG.8D

UNDERSEA PIPE INCLUDING AN INTERNAL LINER

PRIORITY CLAIM

This is a U.S. national stage of application No. PCT/FR2005/002395, filed on Sep. 28, 2005. Priority is claimed on the following application(s): Country: France, Application No.: 04/11055, Filed: Oct. 19, 2004, the content of which are incorporated here by reference.

THE FIELD OF THE INVENTION

The present invention relates to the field of undersea pipes that convey corrosive fluids, in particular sea water, and that include internal liners fitted therein by being threaded therethrough, said liners withstanding said corrosion.

The invention relates more particularly to connecting together two unit pipe elements having internal liners, and more particularly still, it relates to connecting together elements that are 24 meters (m) or 48 m long and that are to be installed in oil fields in deep water, e.g. 2000 m to 3000 m deep, or even more, from a laying ship that is fitted with J-lay towers.

BACKGROUND OF THE INVENTION

The rehabilitation of water, gas, and drainage networks has for many years involved "trenchless" technologies, i.e. technologies that consist in inserting a tubular liner inside an existing pipe, the liner generally being made of a flexible material such as a thermoplastic material, a thermosetting material, or a thermosetting composite material, said liners either being inserted after being folded in half along a longitudinal generator line so as to provide them with a cross-section in the form of a kidney bean, and subsequently being returned to the round merely by applying internal pressure, or else they are pulled through by being put under traction so that the diameter of the liner is reduced to a value that is smaller than the inside diameter of said pipe. Thereafter, once the liner has been pulled through, tension in the liner is released and said liner then returns to its initial diameter, thereby naturally pressing against the inside face of said pipe. That insertion technique is known as "swagelining", and it is commonly used for rehabilitating water or gas pipes over unit lengths that may be as much as 500 m, or even as much as one kilometer in a straight line.

That technology is also used when transporting corrosive fluids under high pressure, thus making it possible to use a pipe for withstanding pressure that is made of steel or carbon in conventional manner, and that is therefore inexpensive, and easy to work by being welded, while resistance to corrosion is ensured by the inner liner. Unit lengths can thus be achieved that can be several hundreds of meters long and that then need to be connected together, while ensuring continuity in protection against corrosion. Three types of connection are in widespread use: connections via flanges, screw connections, and welded connections. When making a connection by means of flanges, it suffices to fold the liner back over the face of the flange, with the clamping of the flanges then pinching the liners face to face and thus providing continuity in the anti-corrosion function. With screw joints, continuity can be provided, for example, by a ring fitted with gaskets that provide sealing with each of the upstream and downstream liners. With welded connections, it is appropriate to interrupt the liner at a significant distance from the end of the pipe, e.g. 100 millimeters (mm) to 200 mm, so that the heating of the steel wall during welding does not damage the liner. The problem which then arises is how to provide protection against corrosion for the non-lined zone extending between the end of the liner in pipe N and the end of the liner in the following pipe N+1.

Patent GB-2 218 488 describes a "swagelining" method consisting in stretching a circular pipe of flexible material, referred to below as a "liner", so as to reduce its diameter in order to enable it to be inserted in a pipe by being pulled, the rest diameter of said liner being greater than the inside diameter of said pipe. Another way of inserting such a liner is to deform it by folding it so as to obtain a cross-section that is "kidney" shaped, and that then fits within a circle of much smaller diameter, thereby enabling insertion to be performed by simple pulling along the inside of the steel pipe. After being pulled through, the considerably-projecting ends return naturally to a substantially circular shape and it is simple to fit a plug thereto. By pressurizing the liner with compressed air, the liner is returned to its circular shape and said liner thus presses firmly against the inside wall of the steel pipe.

Patent GB-2 298 256 describes a method of welding together two pipe elements or portions that are lined over their main extent, the non-lined zone being covered in an alloy that withstands corrosion, said alloy preferably being Inconel that is applied by an electric arc type process referred to as "cladding". The parts are then re-machined so as to present grooved shapes that enable said liner to be anchored by crimping an internal ferrule, it likewise being made of a material that withstands corrosion, and preferably of Inconel. Preparing the ends of pipe elements represents a unit cost that is very high but that is not particularly significant in the overall cost providing the pipe elements used are of long unit length, e.g. several hundreds of meters. However, that cost becomes unacceptable when the unit length of each pipe element is 24 m or 48 m. In addition, the welding of the connection must be performed over the entire thickness of the pipe using the same noble metal, in general Inconel, thereby considerably complicating the work and leading to a cost that is very high, since the unit rate at which metal is deposited is much smaller and the process is more difficult to control than conventional welding on ordinary steel. Finally, it is very difficult to perform quality control on the welding, and for certain types of anti-corrosion material, it is practically impossible to perform such welding in a manner that is reliable and repeatable, in limited time.

Patent GB-2 391 597 describes a method of assembling two lined pipes by inserting around each of said liners a tubular junction sleeve that is received in a setback in the thickness at the end of the steel wall of each of the two pipes elements to be assembled together. Said junction sleeve is then secured to said liners by means of internal ferrules that are expansibly crimped using a tool inside the pipe, said tool being operated from the nearest free end of the pipe. In that patent, each of the pipe elements is bored so as to create a housing for the tubular junction sleeve, which serves as a backing for expansively crimping the internal ferrules that secure the liners to said tubular junction sleeve. The tubular junction sleeve, which is made of an alloy that withstands corrosion, is in direct contact with the steel pipe, in particular in the welding zone. This runs the risk of damage during welding if welding is not performed using the same alloy, and of corrosion in the event of water infiltrating between the liner and the outer steel pipe. In addition, the re-bored zone of each steel outer pipe presents a connection zone of thickness that is smaller than the thickness of the main portion of the pipe, thereby creating a zone of weakness.

Patent WO-2004/015321 describes a tubular junction sleeve between non-lined ends of two pipe elements for assembling together. That tubular sleeve is made of a material that withstands corrosion. On its outside surface it presents machined grooved shapes of outside diameter smaller than the inside diameter of the liner, said ferrule being expansibly crimped using a tool inside the pipe, said tool being operated from the nearest free end of the pipe. In that patent, the tubular junction sleeve is slidable in the internal bore of the liner and presents outside grooves, and the assembly needs to be expansibly crimped using a crimping tool while assembling together the ends of the two pipe elements for assembly on board a J-lay tower.

In GB-2 391 597 and WO-2004/015321, a tool for crimping by expanding the tubular junction sleeve or other connection elements needs to be positioned and operated from the free end of the pipe, i.e. from a distance of 24 m to 48 m, when laying such pipes at sea from a J-lay tower, which can present considerable technical difficulty from an operational point of view and from a quality control point of view.

Patent WO-2004/011840 describes assembling two pipe elements by means of a tubular junction sleeve inserted in the non-lined ends of the steel walls of two pipe elements for assembly. Said tubular junction sleeve is made of a material that withstands corrosion and it is fitted with sealing O-rings that provide sealing with the ends of the liners of the two pipe elements for assembly. Each of the liners is locked in position by an additional ferrule at its end, which ferrule is likewise made of a material that withstands corrosion. Said additional ferrule is expansibly crimped against the ends of said liner. At each of its ends, said tubular junction sleeve includes a portion of its outside surface that comes directly into contact with the steel wall at the non-lined ends of the pipe elements for assembly. That represents a major risk of corrosion when using a tubular sleeve of a corrosion-resistant alloy of the Inconel type and when in the presence of water at the interfaces between the tubular sleeve, the liners, and the steel walls of the pipe elements.

Furthermore, that patent actually describes a method of assembling lined pipes that are intended more particularly to convey multiphase oil, i.e. oil that can contain both gas and water, and that thus requires said liner to be "ventilated" so as to ensure that when the pressure inside the pipe is reduced, any gas that has migrated through the thermoplastic material of said liner does not cause said liner to collapse onto itself. For that purpose, the liner has microchannels enabling pressure to be balanced between the chamber extending between said liner and the outer pipe of steel, and the inside of the pipe. The tubular junction sleeve has holes for allowing pressure to balance between the chamber that exists between said connection part and the outer steel pipe, and the inside of the pipe. In addition, gas is conveyed between the left portion of pipe N-1 and the right portion of pipe N.

That type of structure for lining and assembling two pipe elements for assembly, as described in WO-2004/011840, with permanent perforations through the tubular junction sleeve, which may in part come directly into contact with the steel wall of the pipe, is thus not suitable for making water injection pipes, and in particular pipes for injecting sea water, particularly if the sea water has not been passivated.

SUMMARY OF THE INVENTION

The object of the present invention is to provide methods and devices for lining undersea pipes, and methods and devices for welding together pipe elements as lined in this way, which methods and devices should be simultaneously mechanically reliable, simpler and less expensive to implement, particularly when assembly is performed on site on board a ship at sea, with pipe elements of short length suitable for being laid from a ship at sea.

More particularly, an object of the present invention is to provide such methods and devices for lining and assembling pipe elements that require a minimum number of parts for connecting together non-lined ends of pipe elements for assembly and that do not require special tooling to be used, such as crimping tools, while assembling together two lined pipe elements.

Another object of the present invention is to provide devices and methods for lining and assembling pipe elements that are to make pipes suitable for being laid in great depths, and still more particularly pipes that are suitable for use in injecting water, and in particular in injecting sea water.

To do this, the present invention provides a pipe presenting at least two pipe elements having internal lining and assembled end to end, in which the ends of the two pipe elements are welded to each other and each pipe element comprises:

an inner liner of plastics material, preferably of thermoplastic material, presenting at each end a terminal portion of thickness that is reduced relative to the thickness of the main portion of said liner, defining a circularly symmetrical inside surface of inside diameter that is greater than the inside diameter of the main portion of said liner and terminating at a certain distance from the end of said pipe element; and a single tubular junction sleeve of material that withstands corrosion, preferably of the stainless steel type or of the Inconel alloy type, having substantially the same inside diameter as said liner, interposed inside the abutting ends of the two pipe elements so as to overlap said terminal portions of reduced thickness of the two liners, said sleeve presenting, at least each of its ends, a respective terminal portion of thickness that is reduced relative to the thickness of the central portion of said sleeve, said terminal portions of the sleeve defining an outside surface of outside diameter that is smaller than the outside diameter of the central portion of the sleeve, and a cylindrical inside surface having substantially the same inside diameter as the inside diameter of the cylindrical inside surfaces of the main portions of the liners and of the central portion of the sleeve.

According to the present invention:

the outside surface of each of said terminal portions of reduced thickness of the inner liner is locked by adhesive bonding of the end of the liner at or near said terminal portion of reduced thickness of the liner against the corresponding inside surface of the steel wall of the pipe, using an adhesive that is preferably of the polyurethane or the epoxy type; and said outside surface of each terminal portion of said sleeve is a notched surface, preferably having an end that is substantially tapered to a chamfer enabling it to be inserted in an anchored against the inside surface of the terminal portion of reduced thickness of the corresponding liner, thereby providing a mechanical connection between said outside surface of the sleeve and said inside surface of the liner, merely by forcing said sleeve in the axial longitudinal direction XX' into the inside of said pipe element; and the outside diameter of said cylindrical central portion of the sleeve is less than the inside diameter of the non-lined ends of the steel walls of said pipe element so that said sleeve does not come directly into contact with said steel walls, and co-operates therewith and with the ends of the liners on either side of the sleeve to defined an annular chamber.

The terms "inner" and "outer" relate respectively to inside and outside the pipe, the sleeve, or the liner, as appropriate.

The making of internally lined pipe elements fitted at one end with a said sleeve, and the assembly of pipe elements lined in this way and fitted with a said tubular sleeve satisfies the objects of the present invention.

It will be understood that bonding the terminal portion of the liner by adhesive avoids any need to implement a locking ferrule or other screwing or crimping with a collar, and the bonding of the junction sleeve likewise does not require any implementation of a locking ferrule or screwing or some other crimping tool that deforms said sleeve, with this applying both during initial fabrication of the pipe element and when assembling together two pipe elements.

The inside surface of each of the terminal portions of liner is substantially cylindrical and is subjected to creep during forced insertion of said sleeve and during the elastic deformation of the notched outside surface, by the pressure of the notched outside surface thereof against said inside surface of the liner.

After two pipe elements have been joined together, the outside surface of the central portion of the sleeve and the corresponding inside surface of the steel wall of the non-lined terminal portion of said pipe element co-operate to define an annular chamber because of their different diameters respectively on the outside and the inside. This makes it possible to avoid any direct contact between the stainless steel or Inconel alloy of the sleeve and the steel of the pipe element. In the event of water penetrating into said chamber when the pipe is a water injection pipe, such direct contact could lead to electrochemical phenomena of corrosion of the steel pipe, insofar as said mechanical connection between the sleeve and the liner is not necessarily leaktight. The lack of contact between the sleeve and the steel wall of the pipe allows conventional welding to be performed of the type that is commonly used for welding pipe lines, and it makes it possible to avoid the use of expensive welding using a noble alloy identical to that which might be used as the material constituting said sleeve, in particular an Inconel alloy.

Nevertheless, in an embodiment, said tubular junction sleeve may be made of a composite material of the epoxy carbon type, said sleeve being made for example by filamentary winding so as to form a blank, and then being re-machined in its end zones in order to form the required notching.

More particularly, the present invention provides a pipe suitable for being laid at great depth in the sea, preferably up to 3000 m, and said pipe elements have a length lying in the range 20 m to 50 m.

Still more particularly, the pipe is for injecting water, in particular sea water, or even non-passified sea water, into oil fields.

The present invention also provides an internally-lined pipe element suitable for making a pipe of the invention and characterized in that it comprises a liner with a terminal portion of reduced thickness at each end, as defined above, and a said tubular junction sleeve inserted at only one of its ends and projecting therefrom, the projection of said sleeve defining a male end of said pipe element suitable for being connected to an end that does not have a said sleeve and that defines a female end of another said pipe element of the same kind.

The present invention also provides a method of making a pipe of the invention by assembling together pipe elements of the invention, the method being characterized in that the female end without a tubular junction sleeve of a pipe element for assembly is engaged and forced around the male end of the stationary tubular junction sleeve that projects from the terminal pipe element of a pipe that is being assembled, axially in the longitudinal direction XX' inside said female end, and then the non-lined ends of the steel walls of the two pipe elements are butt-welded together.

In an implementation, a said cross-linkable material or a said gel is injected through a hole previously formed through the wall of said sleeve or said steel wall of the pipe, injection taking place via a vacuum chamber fitted in register with said hole, after a vacuum has been established in said annular chamber, and then said vacuum chamber is removed and said hole is plugged.

The present invention also provides a method of making a pipe element of the invention, characterized in that the following steps are performed:

1) said internal lining is provided by inserting a pipe of flexible and elastic thermoplastic material for forming said liner into a first end of a pipe element, the thermoplastic pipe being circular in section or folded to a kidney shape, and by pulling said thermoplastic pipe in said pipe element to the second end of the pipe element, and then releasing traction so as to enable it to expand radially and become bonded against the inside surface of the wall of said pipe element; and 2) cutting away and machining the ends of said liner pipe so as to form said terminal portions of reduced thickness of said liner and a non-lined terminal portion of the steel wall of said pipe element at each of its ends.

According to another advantageous characteristic of the method of making a pipe element of the invention, the outside surface of the thermoplastic liner pipe is coated in adhesive in at least one zone situated outside said pipe element, at least beside said first end of said pipe element after release of the traction and after complete shrinkage of said liner pipe, close to or at the terminal portions of reduced thickness of the liner.

In a preferred implementation, the outside surface of the thermoplastic liner pipe is coated in adhesive in two zones situated outside said pipe element, beside said first and second ends respectively of said pipe element, and designed to be positioned, after traction has been released and said liner pipe has shrunk fully, close to or at each of said terminal portions of reduced thickness of the liner.

In another implementation, prior to step 1), the inside surface of said second end of the pipe element is coated in an adhesive in a first zone that is designed to be in register with a corresponding first zone of said liner corresponding to the vicinity of or at said terminal portion of reduced thickness of the liner after machining, and the outside surface of the thermoplastic liner pipe is coated in adhesive close to or at a second zone of said liner that is to form said terminal portion of reduced thickness of the liner beside said first end of said pipe element after machining.

According to another advantageous characteristic of the present invention, cold plasma treatment is performed using a device situated outside said pipe element on the zones of the outside surfaces of the thermoplastic liner pipe that are to be coated in adhesive or that are to be pressed against an adhesive-coated zone of the steel wall of a said pipe element, in order to encourage bonding effectiveness.

In a particular implementation, the outside surface of the thermoplastic liner pipe is treated with a cold plasma firstly in a said first zone of said flexible liner pipe that is to be adhesively-bonded to a said first adhesive-coated zone of the inside surface of the steel wall at said second end of said pipe element, and secondly at a second zone of the outside surface of said flexible liner pipe that is subsequently to be coated in an adhesive, said plasma treatment being performed prior to inserting said flexible liner pipe inside said pipe element.

Advantageously, said plasma treatment is performed at said first zone of said flexible liner pipe over a length that is greater than the sum of the shrinkage length of said flexible pipe after traction has been released from said liner pipe, plus the length of said first adhesive-coated zone of the inside surface of the steel wall at said second end of the pipe element, so that said first zones overlap over their full length after traction is stopped and until complete shrinkage of said liner pipe after said traction has been released.

To do this, it will be understood that it is possible to stop traction on said liner pipe when the rear end of said first zone of said liner pipe comes up to said first adhesive-coated zone of the steel wall at the second end of the pipe element. After traction has been released, the front of the first zone of the liner pipe will come into register with said adhesive-coated first zone of the pipe element.

Preferably, prior to step 1), said thermoplastic liner pipe is heated so as to make it easier to stretch it to a smaller diameter, preferably by passing through a die.

It will be understood that said pipe of flexible material, prior to being heated and subjected to traction at rest, presents an outside diameter greater than the inside diameter of the pipe element, and that it is inserted and stretched by heating and traction so as to present a shape of section that is substantially circular and of reduced diameter.

BRIEF DESCRIPTION OF THE DRAWINGS

Other characteristics and advantages of the present invention appear in the light of the following detailed description with reference to the following figures, in which:

FIGS. 1E and 1F are side views in section showing a variant way of inserting and adhesively bonding an internal liner, respectively during the adhesive bonding stage (FIG. 1E), and during the stage of releasing the tension on said liner (FIG. 1F);

FIG. 2A shows the circular section of the liner at rest in the absence of tension or of deformation, corresponding to plane AA in FIGS. 1A-1D;

FIG. 2B shows the circular section of smaller diameter of the liner subjected to tension from a winch, and corresponding to plane BB in FIGS. 1A-1C;

FIG. 2C shows a variant embodiment in which the section of the liner is deformed into a "kidney" shape for insertion into the pipe;

FIG. 2D shows the section of the liner deformed into a "kidney" shape using a device comprising four wheels;

FIGS. 3A and 3B are side views in section of a steel pipe element through which a liner of thermoplastic material has been pulled, the liner being bonded adhesively close to the end when the pulling process is finished, and being shown respectively before (FIG. 3A) and during (FIG. 3B) machining of said liner;

FIG. 4 is a side view in section of a tubular junction sleeve of material that withstands corrosion, ready to be inserted in said machined liner of FIG. 3B;

FIG. 4A shows details of the notched end surface of the tubular junction sleeve;

FIG. 5 is a side view in section of a unit length of pipe fitted with its junction sleeve at its left-hand end and ready to be shipped for installation on site;

FIG. 6A is a side view of an installer ship fitted with a so-called "J-lay" tower;

FIGS. 6B and 6C are side views in section showing stages of assembling two successive lengths of lined pipe, respectively during an approach stage (FIG. 6B) and during a welding stage (FIG. 6C);

FIG. 6D is a section relating to FIG. 6B showing detail of the positions of the centering spacers close to the welding zone;

FIGS. 8A-8F are diagrams that result from finite-element calculations describing six stages of sleeve insertion and showing how the sleeve is deformed and also how the flexible material constituting the liner is subjected to creep;

DETAILED DESCRIPTON OF THE PRESENTLY PREFERRED EMBODIMENTS

Figure 1:
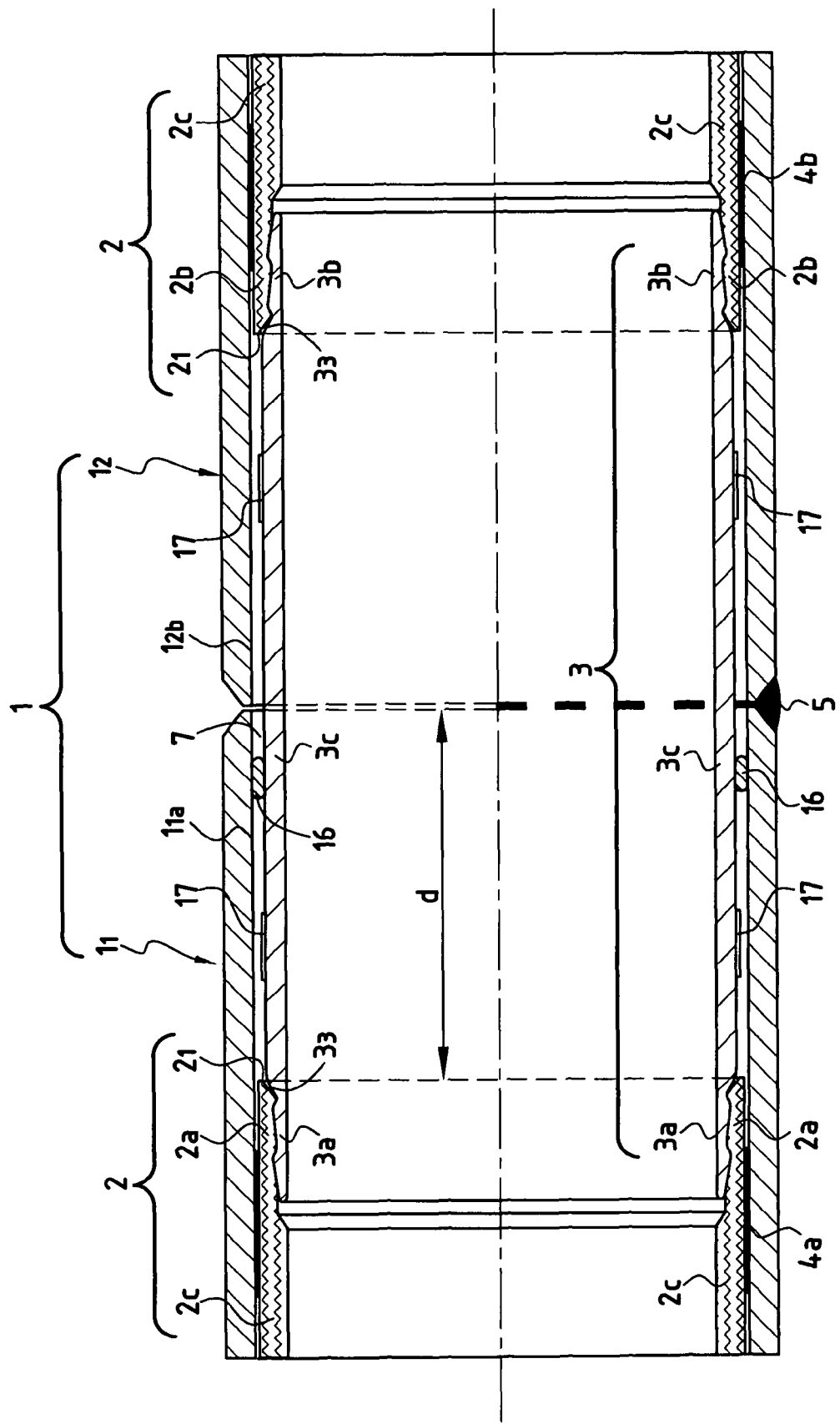
FIG. 1 is a side view in section showing how a pipe of the invention is assembled using a tubular junction sleeve between two pipe elements or unit lengths of lined pipes of the invention.

FIG. 1 shows a pipe of the invention comprising at least two pipe elements $1_1$, $1_2$ with internal liners that are assembled end to end, in which the ends of the two pipe elements are welded to each other at 5, and in which each pipe element comprises:

an inner liner of thermoplastic material 2 presenting at each end a terminal portion 2a, 2b of thickness that is reduced relative to the thickness of the main portion 2c of said liner, defining a surface of revolution of inside diameter that is greater than that of the main portion 2c of said liner and terminating at a certain distance d from the end of said pipe element, having an axis XX' that coincides substantially with the axis of the pipe elements $1_1$, $1_2$. The outside surface of each said terminal portion 2a, 2b of the inner liner is locked by adhesive bonding 4a, 4b between the end of the liner at or close to said terminal portion 2a, 2b of reduced thickness of the liner and the corresponding inside surface of the steel wall of the pipe, by using an adhesive, preferably of the polyurethane type or of the two-component epoxy type; and a single tubular junction sleeve 3 of material that withstands corrosion, preferably an Inconel alloy, having substantially the same inside diameter as said liner, interposed inside the touching ends of the two pipe elements so as to overlap said terminal portions of the two liners 2a, 2b, said sleeve presenting at each of its ends a respective terminal portion 3a, 3b of thickness that is reduced relative to the thickness of the central portion 3c of said sleeve, said terminal portions 3a, 3b of the sleeve defining a circularly symmetrical outside surface of outside diameter that is smaller than that of the central portion $3c$ of the sleeve, and a cylindrical inside surface having the same inside diameter as the inside diameter of the main portion of the liner and of the central portion $3c$ of the sleeve, its axis XX' coinciding substantially with the axis of the pipe elements $1_1$, $1_2$.

Said circularly symmetrical outside surface of each terminal portion $3a$, $3b$ of said sleeve has a notched surface $3_2$, in particular including three to five notches $3_2$ presenting sloping inclinations, as shown in FIG. 4A, at an angle $\alpha$ that is less than 45° and preferably of the order of 30°, and at an angle $\beta$ that is greater than 45° and preferably of the order of 60°, enabling it to be inserted in and anchored against the inside surface of the terminal portion $2a$, $2b$ of reduced thickness of the corresponding liner, the end notch gives the sleeve an end that presents a substantially tapering chamfer $3_1$, as shown in FIG. 4A. This provides a mechanical connection between said outside surface of the sleeve and inside surface of the liner, merely by forcing said sleeve in the longitudinal axial direction into said pipe element.

The outside diameter of said cylindrical central portion $3c$ of the sleeve is less than the inside diameter of the non-lined ends $1_1a$-$1_1b$, $1_2a$-$1_2b$, of the steel walls of said pipe elements, such that said sleeve is not directly in contact with said steel walls, and co-operates therewith and with the ends $2_1$ of the liners on either side of said sleeve, to define an annular chamber 7.

Said sleeve is inserted against the terminal portion $2a$, $2b$ of reduced thickness of the liner until the end $2_1$ of the liner comes into abutment against a shoulder $3_3$ defining said central portion $3c$ of the sleeve and said terminal portion $3a$, $3b$ of smaller thickness of the sleeve.

In a variant embodiment that is not shown, said sleeve is inserted against the terminal portion of the liner until the end $3_1$ of the sleeve comes into abutment against the shoulder $2_2$ defining the boundary between the main portion and said terminal portion $2a$, $2b$ of reduced thickness of the liner, thereby advantageously reducing turbulence in the transition zone between the main portion of the liner 2 and the tubular junction sleeve.

Figure 1A:
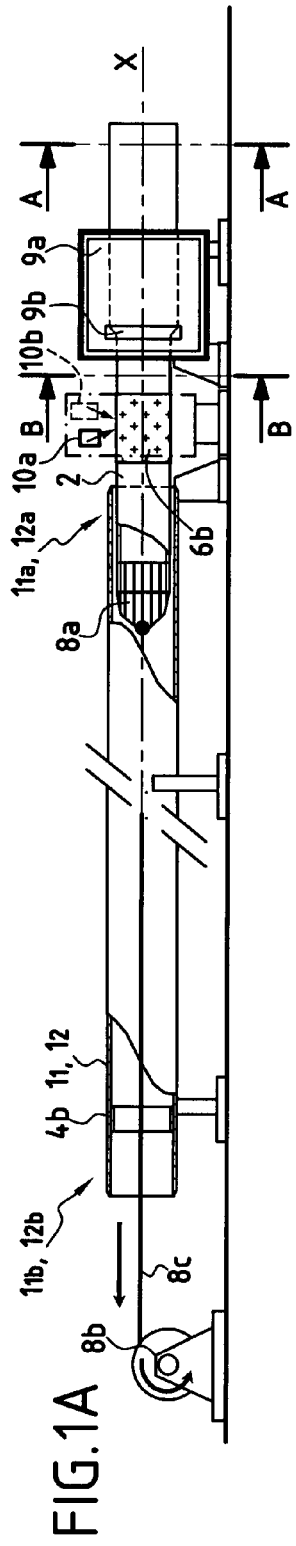
FIGS. 1A, 1B, 1C, and 1D are side views in section of a pipe element constituting a unit length of steel pipe through which an inner lining pipe is inserted that is made of thermoplastic material, shown respectively when starting traction (FIG. 1A), while traction has been interrupted in order to bond said liner adhesively (FIG. 1B), and during a final stage of applying traction prior to releasing the tension on said liner (FIG. 1C), and after releasing the traction (FIG. 1D)
Figure 1B:
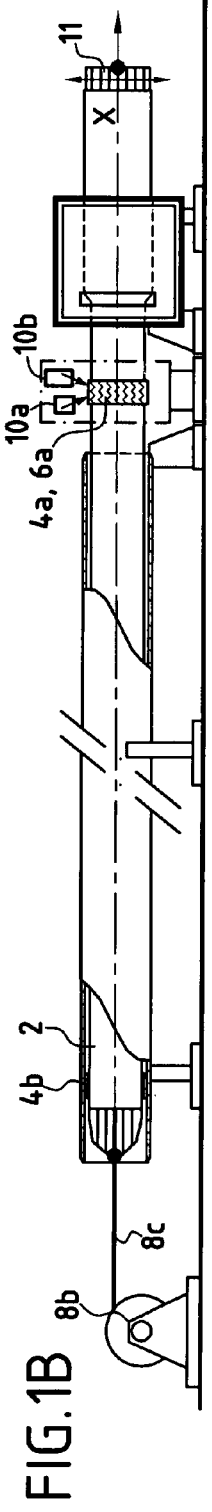
Figure 1C:
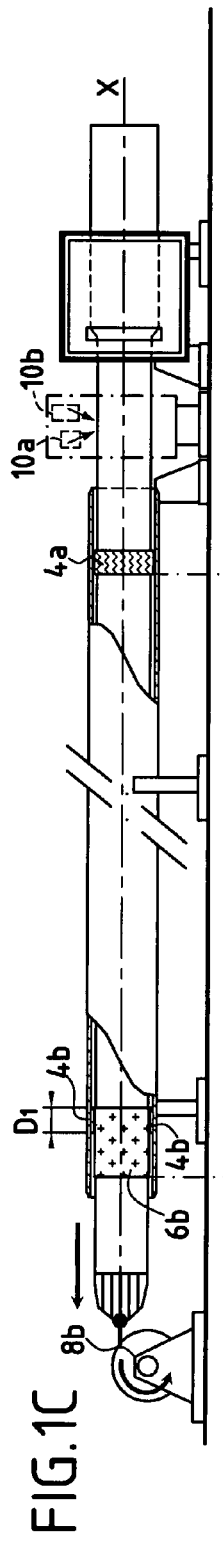

In FIGS. 1A to 1B, there can be seen a method of making a lined pipe element of the invention, in which the following steps are performed:

A) heating the liner pipe 2 of flexible and elastic thermoplastic material of circular cross-section $7_1$ using a heater installation $9a$ placed outside the pipe element that is to be lined adjacent to a first end thereof, and then said liner pipe passes through a die $9b$ so as to reduce its outside diameter when axial traction is exerted thereon, said outside diameter being smaller than the inside diameter of the pipe; and B) said liner pipe is pulled inside said pipe element until it reaches the second end of said pipe element where the inside surface is coated in adhesive $4b$ in a first zone that is to be located in register with a first zone $6b$ of said liner pipe, close to or at the portion that is to constitute the terminal portion $2b$ of reduced thickness at the end of the liner after machining, as explained below; and C) the outside surface of the thermoplastic liner pipe is treated with a cold plasma firstly at a first zone $6b$ of said flexible liner pipe that is to be bonded to a said first adhesive-coated zone $4b$ of the inside surface of the steel wall at said second end of said pipe element, and secondly at a second zone $6a$ of the outside surface of said flexible liner pipe that is subsequently to be bonded at $4a$, said plasma treatment being performed prior to inserting said flexible liner pipe into the inside of said pipe element; and D) the ends of said liner pipe are cut and then machined so as to form said terminal portions $2a$, $2b$ of reduced thickness of said inner liner, and so as to form a non-lined terminal portion $1_1a$-$1_1b$, $1_2a$-$1_2b$ of the steel wall of said pipe element at each of its ends, as explained below.

Figure 1D:
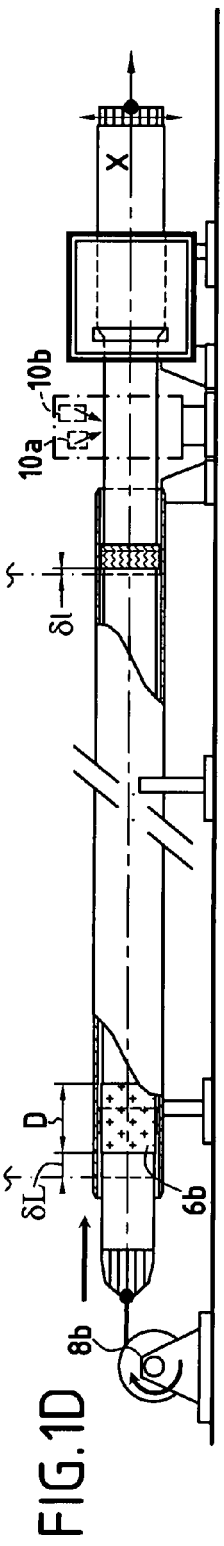

In FIGS. 1A to 1D, there can be seen in greater detail the various stages of pulling a liner pipe 2 of elastic material such as polyethylene, polypropylene, polyamide, or indeed a fluorinated thermoplastic, inside and through the steel pipe element $1_1$, $1_2$ from a first end to its second end, using the so-called "swagelining" method. To this end, the liner when not subjected to traction presents in the plane AA a diameter $1a$ that is several millimeters or indeed a few centimeters (cm) greater than the inside diameter of the pipe 2. The liner 1 is fitted with a traction head $8a$ connected to a winch $8b$ outside the pipe element beside its second end, by means of a cable $8c$ that passes through the steel pipe, substantially at its center. Said liner passes in succession through a reheater oven $9a$, then through a die $9b$ which it leaves going towards the pipe with an outside diameter that is a few mm or even a few cm less than the inside diameter of said pipe element. During this traction, the liner thus has its diameter reduced, and also has its nominal length increased. In a stage of preparing pulling, the inside steel wall of steel pipe element is coated in adhesive, preferably a two-component polyurethane or epoxy adhesive, in a zone $4b$ that is situated about 20 cm to 40 cm from said second end, after the surface has been prepared by brushing or by sand-blasting. Thereafter, pulling is performed over a length L, and then as shown in FIG. 1A, the pulling process is interrupted, and a device fitted with a semi-cold plasma torch $10a$ performs treatment on the zone $6b$ over the entire periphery of the liner, which treatment will, at the end of the process, co-operate with said adhesive-coated zone $4b$ inside the pipe, as shown in FIG. 1D. When the plasma treatment is finished, pulling is restarting until the position shown in FIG. 1B is reached where pulling is interrupted again by locking the liner pipe at 11. A small zone $6a$ at the outside of the liner pipe is then treated over its entire periphery by means of the semi-cold plasma torch $10a$ and is then coated with a thickness of 0.1 mm to 1 mm of adhesive, preferably of the two component polyurethane or epoxy type, by means of an applicator head $10b$. Pulling is then restarted so as to reach the position shown in FIG. 1C, with the plasma-treated zone $6b$ of the liner then being situated in register with the adhesive-coated zone $4b$ of the pipe element. In this position, the liner 2 is locked at 11, and then the tension in the winch $8b$ is relaxed. The liner pipe then shrinks along its axis XX because of its elasticity, and its outside diameter increases radially until it comes into abutment against the inside of the pipe element. Because the liner pipe is locked at 11, the shortening beside the winch $8b$ though $\delta L$ is much greater than the shortening through $\delta l$ beside the locking device 11. Because of uncertainty about this shrinkage, the zone $6b$ that is pretreated by plasma needs to be large, so as to be certain that it will collaborate with the adhesive-coated zone $4b$ whatever the uncertainty concerning the value of $\delta L$.

In a preferred version, shown in FIGS. 1E and 1F, a plasma treatment device $10a$ and an adhesive coating device $10b$ are installed outside the steel pipe element at each of its ends. Traction is then applied in a single operation without any intermediate interruption, thus avoiding any need for intermediate stop. The plasma treatment and the coating of the liner pipe with adhesive are then performed outside the pipe element in two zones $6a$, $6c$ so that the corresponding adhesive-coated zones $6a$, $6c$ are Located simultaneously outside the steel pipe, as shown in FIG. 1E, which might require the tension that is exerted on the liner to be considerably greater than that needed during the procedure described above with reference to FIGS. 1A-1D. The plasma treatment is then performed, as is the adhesive coating on the periphery, after which the tension in the liner is relaxed sequentially or simultaneously so that the adhesive-coated zones $4a$, $4c$ are positioned at the required locations inside the steel pipe. In this configuration, it is necessary to have thorough control over the behavior of the liner so that the shrinkage of the liner and its expansion in diameter take place with sufficient accuracy for the adhesive to be properly positioned.

The cold plasma treatment of the surface of the liner makes it possible firstly to eliminate any trace of residual pollution, and secondly to break the molecules of the outer thermoplastic wall of said liner, thus greatly improving bonding with adhesive, and in particular with adhesives of one- or two-component polyurethane or epoxy type. The plasma treatment is advantageously performed using a torch of the "Plasma Pen" type as can be obtained from the supplier PVA-Tepla, France, said torch being operated either manually or by a robot.

FIG. 2A shows the circular section of the liner pipe at rest in the absence of tension or deformation, corresponding to plane AA in FIGS. 1A-1D. In FIG. 2B, there can be seen the section of the liner of smaller diameter as subjected to tension from a winch and corresponding to plane BB in FIGS. 1A-1C.

In the pulling process described above with reference to FIGS. 1A to 1F, the "swagelining" method is advantageously replaced by a "kidney" technique for reducing diameter, known to the person skilled in the art and shown in FIG. 2C, where there can be seen the section of the liner deformed into a "kidney" shape for insertion into the pipe. FIG. 2D shows how the liner pipe is given a "kidney" shape by means of four wheels, one of which presses against and pushes in a longitudinal generator line of the liner pipe. When using the "kidney" shape shown in FIG. 2D, the plasma treatment and the coating in adhesive cannot be performed simply over the entire periphery of the liner, and as a consequence it is necessary to be satisfied with treating only the convex portion as can be seen in said figure, representing 60% to 80% of the periphery of said liner. The missing area is then compensated by increasing the length of the liner over which said treatment is performed.

At the end of the insertion and adhesive bonding process, the liner is then trimmed flush with the steel pipe element, and then a machining machine 12 is installed on the face of the first end of the pipe element, as shown in FIG. 3A-3B. The machine is constituted in conventional manner by a structure $12a$ carrying drive means (not shown) serving to rotate a tool-carrier shaft $12c$, with a device $12e$ serving to move the tool-carrier along the direction XX, a device $12f$ moving the machining tool $12d$ in a radial direction. The machine is fitted with centering means $12b$ that enable the axis XX of said machine to be adjusted so as to be brought into coincidence with the axis of the pipe element, thus making it possible to machine the inside of the liner at its ends in a manner that is accurately concentric with said steel pipe. For clarity of the drawings, in FIGS. 3A-3B, the liner 2 is shown as being placed back a little from the wall of the steel pipe element, so as to reveal the approximate position of the adhesive-coated zone $4a$ relative to the machined zone of the terminal portion $2a$ of said liner that is of reduced thickness. The liner and the wall are in fact in intimate contact with each other, and the adhesive $4a$ spreads naturally over a large area, with only the zone of the liner that has been subjected to plasma treatment presenting high levels of bonding, in known manner, while the non-treated zones present practically no adhesion.

After the liner has been machined to have the required profile at each of its ends, the tubular junction sleeve 3 of FIG. 4 is forced into the end of the lined pipe element, preferably from the left-hand end of the pipe, i.e. from beside the winch $8b$. The pipe element is then terminated and ready for shipping to the assembly site, as shown in FIG. 5. By acting in this way, the free end of the liner is assembled on site, corresponding to the adhesive-coated zone $4a$ that is accurately positioned, as described above with reference to FIG. 1D.

Said pipe element has a liner 2 with terminal portions $2a$, $2b$ of reduced thickness at each end, as defined in any of claims 1 to 3, together with a said tubular portion sleeve 3 inserted into only one of its ends and projecting therefrom, the projecting portion of said sleeve defining a male end $3_4$ of said pipe element $1_1$ that is suitable for being assembled with an end that does not have such a sleeve and that defines a female end $2_3$ of another pipe element $1_2$ of the same kind.

FIG. 6 shows two unit lengths of lined pipe being assembled together during installation on site, as performed on board a laying ship $13a$ that is fitted with a J-lay tower $13b$, as shown in FIG. 6A. For this purpose, the terminal pipe element $1_1$ of an already laid lined pipe is held securely suspended from the bottom of the tower, and a new lined pipe element $1_2$ is transferred in known manner from the horizontal position to an oblique position corresponding to the inclination of the tower so as subsequently to be positioned on the axis of the lined terminal pipe element $1_1$. Said pipe element for assembly $1_2$ is then moved axially towards the suspended terminal pipe element $1_1$. The female end $2_3$ that does not have a tubular junction sleeve of a pipe element $1_2$ for assembly is then engaged by force around the male end $3_4$ of the stationary tubular junction sleeve that projects from the terminal pipe element $1_1$ of a pipe that is being assembled, by being moved axially in the longitudinal direction XX' inside said female end $2_3$, after which the non-lined ends of the steel walls of the two pipe elements are butt-welded together at 5. The top portion of the sleeve 3 penetrates into the end of the pipe element $1_2b$ for assembly until it comes into contact with the end $2_1$ of the liner that has previously been machined with great precision. Said sleeve is inserted against the terminal portion $2a$, $2b$ of reduced thickness of the liner until the end $2_1$ of the liner comes into abutment against a shoulder $3_3$ defining the boundary between said central portion $3c$ of the sleeve and said terminal portion $3a$, $3b$ of smaller diameter of the sleeve. Since the pipe element is close to the vertical, it owns weight is sufficient for then enabling the sleeve to penetrate fully into the liner so as to reach the configuration of FIG. 6C in which the two pipe elements $1_1$, $1_2$ are held a few mm part, e.g. by simple spacers (not shown), so as to make it possible to perform the welding 5 in conventional manner. In the top left portion of FIG. 6C there can be seen the chamfered steel pipe walls $5_1$ that are spaced apart by a few mm, while the bottom right portion shows a finished weld 5.

As shown in FIGS. 6B and 6D, spacers 16 are advantageously installed, e.g. three spacers that are uniformly spaced apart around the periphery of the tubular junction sleeve and that are situated close to the welding zone 5, so as to improve the mutual engagement of said sleeve 3 in said steel pipe $1_1$. These spacers are advantageously machined to accurate dimensions and engaged by forcible insertion from the outside into the gap that extends between the outside surface of the central portion $3c$ of said sleeve and the inside surface of the steel wall at the non-lined end $1_1b$ of the pipe element for which said sleeve constitutes a male end.

The spacers 16 are advantageously made of a material that is not conductive, and thus that is not a metal, and that is capable of withstanding the temperature that is generated where they are located by the welding assembly process on board the installation ship 13*a*. Thus, they are made either of composite material or of ceramic material, or indeed more simply of a mortar of sand and cement. In a preferred version, such spacers are made merely by injecting a limited volume of mortar with the help of a needle, said volume spreading, e.g. over an area having a diameter of 4 cm, thereby creating said spacer in situ without there being any need for prior adjustment of thickness, and thus securely locking said sleeve relative to said pipe. FIG. 6D shows this spacing in detail.

When the weight of the pipe element $1_2$ is insufficient to ensure that the tubular junction sleeve becomes inserted naturally, then the carriage handling said pipe element within the J-lay tower is advantageously made heavier so as to provide sufficient reserve force capacity. In a preferred version, an actuator device is used which, on being secured to the outside of the pipe element $1_2$ serves to apply force thereto while the tubular junction sleeve 3 is being inserted.

In a preferred version shown in FIGS. 1 and 6B, a passivation agent 17 is advantageously placed around the tubular junction sleeve prior to inserting the sleeve during assembly of the pipe, or while insertion is taking place within the J-lay tower; under such circumstances, said passivation agent is positioned in the zone $3_4$.

Figure 7:
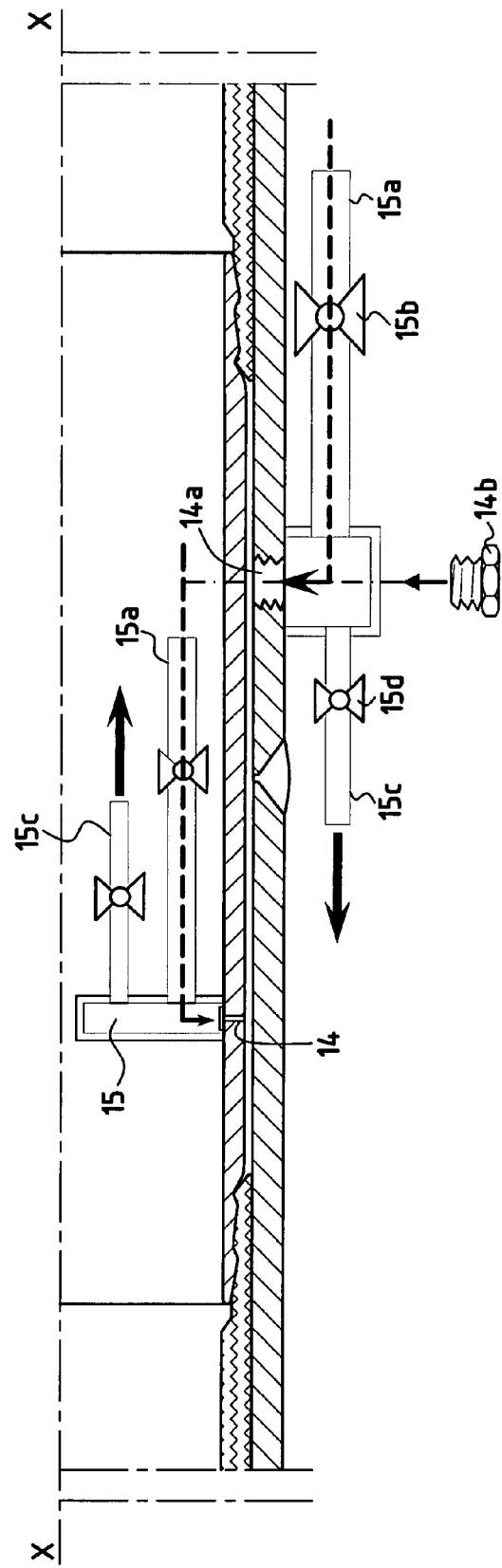
FIG. 7 is a section through the connection of the tubular junction sleeve and the liner, showing how a fluid is injected into the annular chamber that exists between said sleeve, the ends of the liners, and the steel pipe, with injection taking place either from the outside, or else from the inside.
Figure 8E:
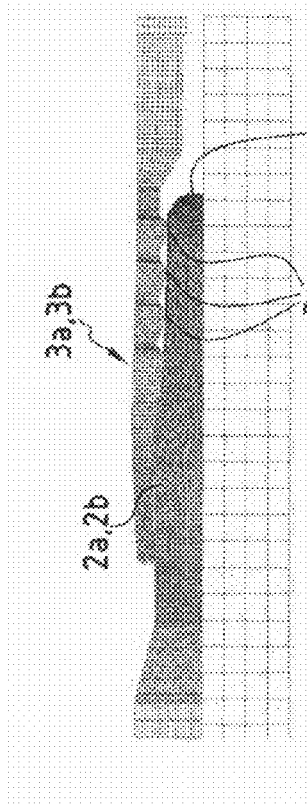
Figure 8F:
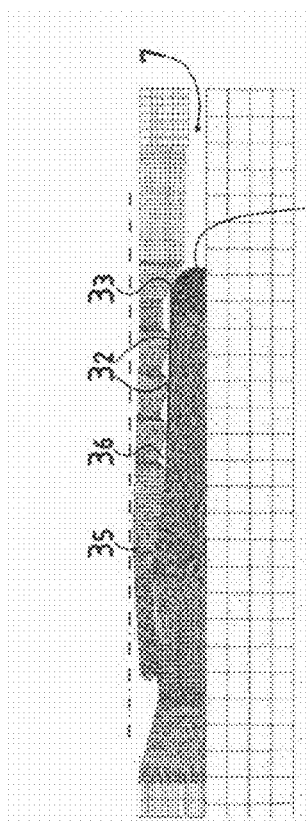

In a preferred version shown in FIG. 7, the annular chamber 7 lying between the sleeve, the ends $2_1$ of the liners, and the outside wall of the steel pipe has a quasi-incompressible and cross-linkable material such as polyurethane, epoxy, acrylic, or indeed a thick gel that is insoluble in water, injected therein so as to eliminate any bubbles of air that might be present in said chamber. For this purpose, the substance is injected either from the outside of the pipe, as shown in the bottom portion of FIG. 7, or else from the inside, through the tubular junction sleeve 3, as shown in the top portion of the same FIG. 7. When proceeding from the outside, it is necessary to begin by providing a threaded hole 14*a* passing through the wall and providing communication between said chamber and the outside. A vacuum chamber 15 is then pressed against the outside of the pipe in leaktight manner, the vacuum chamber being provided with a duct 15*a* for delivering a cross-linkable material and with an isolation valve 15*b*, and also with a duct 15*c* for drawing the vacuum and an isolation valve 15*d*.

The filling sequence is then as follows:
the valve 15*b* is closed and the valve 15*d* is opened; and
the chamber 7 is evacuated; and
the valve 15*d* is closed and the valve 15*b* is opened; and
the cross-linkable material then completely fills the chamber 7; and
the vacuum chamber 15 is removed; and
the orifice is plugged with a threaded plug 14*b*.
when proceeding from the inside, a small hole 14 is previously formed through the tubular junction sleeve 3, e.g. a hole having a diameter of 3 mm, and in similar manner the vacuum chamber 15 provided with its orifices and its isolation valves is put into place and the same sequence as described in detail above is performed, with a final step of leaving the filler hole open, with it then sufficing to eliminate any traces of substance from the inside face of the tubular junction sleeve. Once the substance has cross-linked it plugs the hole.

In this variant of injection from the inside, during installation on site, it is advantageous to position the vacuum chamber on the sleeve 3 of the terminal pipe element $1_1$ in suspension in the J-lay tower, and then prior to lowering the new element $1_2$, to connect an umbilical cord (not shown) that is used for controlling the above-described process, said umbilical cord passing all along the lined pipe element $1_2$ and leaving it at the top of the tower prior to returning to the control station. Once injection is terminated, a disconnection signal is delivered via the umbilical cord, and the release chamber can be recovered from the top of the tower so as to be cleaned, refilled, and prepared for the following cycle. By proceeding in this way, the vacuum chamber can be of very small dimensions and can be put into position and locked in position without any difficulty since the operator can see quite clearly the position of the orifice 14 which is advantageously situated close to the end of the sleeve 3 in FIG. 6B.

FIGS. 8A to 8F are diagrams showing the results of finite-element calculations concerning the successive stages of engaging the tubular junction sleeve, and showing the plastic deformation of the thermoplastic material of the liner, and also the elastic deformation of the tubular junction sleeve. Said deformation of the sleeve is at a maximum at the top $3_5$ of the chamfered end $3_1$ in FIG. 8F, which zone also corresponds to the maximum plastic deformation of the thermoplastic material of the liner, thereby creating a sealing ring. The multiple notches $3_2$ in the outside surface of the tubular junction sleeve apply plastic deformation, to a smaller extent, to said liner at the tops of the notches $3_2$, thereby creating additional sealing rings. Said tubular junction sleeve then comes into abutment against the liner. Said sleeve is inserted against the terminal portion 2*a*, 2*b* of reduced thickness of the liner until the end $2_1$ of the liner comes into abutment against a shoulder $3_3$ that defines the boundary between said central portion 3*c* of the sleeve and said terminal portion 3*a*, 3*b* of smaller diameter of the sleeve. The prestress as obtained in this way in the tubular junction sleeve, associated with the plastic deformation of the thermoplastic material, then embeds said tubular junction sleeve in the liner and thus in the steel pipe. The axis XX of the tubular junction sleeve then coincides with the axis of the steel pipe, thus providing guidance and greatly facilitating insertion of the female portion $2_3$ of the pipe element for assembly on the male portion $3_4$ at the end of the terminal pipe element at an already assembled pipe, during installation in the J-lay tower as explained above with reference to FIGS. 6A-6C.

Over time, the thermoplastic material will be caused to creep and the cavities $3_6$ between the notches $3_2$ are filled in progressively over several years or tens of years by said thermoplastic material. In the same manner, the tubular junction sleeve presents maximum initial deformation at $3_5$, but merely because of its elasticity it returns towards its natural cylindrical shape, thus acting as a spring and compensating for said creep of the thermoplastic material, thereby continuing to provide sealing of the annular chamber 7.

Figure 9A:
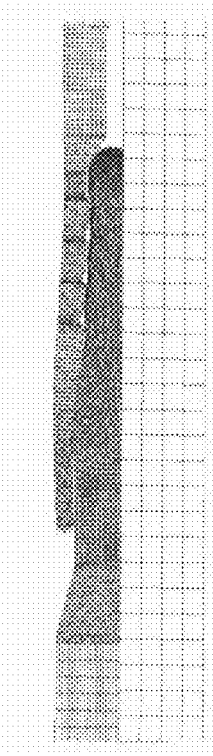
FIG. 9A shows the result of a finite-element calculation describing the deformation of the sleeve and the plastic deformation of the liner when the pipe is subjected to internal pressure, the chamber between said sleeve, the ends of the liners, and the steel pipe remaining substantially at atmospheric pressure.
Figure 9B:
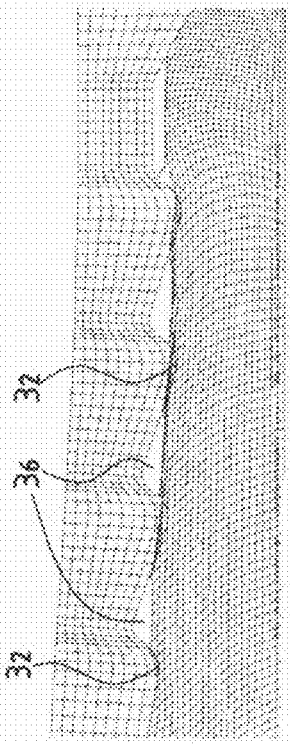
FIG. 9B shows a detail of the notched outside surface of the sleeve, corresponding to FIG. 9A.

FIG. 9*a* shows the lined pipe subjected to an operating pressure P=50 megapascals (MPa) while the chamber 7 remains substantially at atmospheric pressure. This leads to radial expansion of the tubular junction sleeve which then alone withstands the bursting force throughout the chamber zone 7, with the steel pipe in said zone being subjected to substantially no bursting effect. FIG. 9B is an enlargement showing the notched zone of the tubular junction sleeve shown in FIG. 9A and it illustrates how the tops of said notches penetrate into the thermoplastic material of the liner, and it also shows the creep of said thermoplastic material towards the chamber 7 created by the pressure P acting on the inside of the lined pipe while it is in service.

The sleeve is described as being made of a material that withstands corrosion, and more particularly as being made of a metal material, more particularly still as being made of an Inconel alloy, however it would remain within the spirit of the invention to use a composite material, for example a carbon or glass fiber composite within a bonding matrix, e.g. of the polyurethane or epoxy type. Various methods can be envisaged for manufacture, for example winding a filament on a mandrel, overmolding the organized fibers in a fluid resin, or any other method suitable for making circularly symmetrical parts of high mechanical strength. The resins should be selected in such a manner as to enable them to withstand the heat that is generated by welding the pipes together while the elements are being assembled together on site, within the J-lay tower, and advantageously a heat screen is inserted, e.g. made of ceramic fibers, between said tubular sleeve and said steel pipe, in the vicinity of the junction.

The ends of the tubular junction sleeve are described as presenting circularly symmetrical notches, however it would remain within the spirit of the invention for the notches to be provided by a thread of helical shape, and for them thus to be constituted by a single projection that performs a plurality of turns around the periphery of said tubular junction sleeve. Thus, the tubular junction sleeve could be put into place at the manufacturing site either by being pushed in using a press as explained above, or else by being screwed in until said tubular junction sleeve comes into abutment against the end face of the liner. In the same manner, installation on site within the J-lay tower can be performed either by being pushed in directly, or else by being screwed in, the notched surface of the second end of the tubular junction sleeve possibly being either circularly symmetrical or else helical in shape.

The invention claimed is:

1. A pipe presenting at least two pipe elements having internal lining and assembled end to end, in which the ends of the two pipe elements are welded to each other, each pipe element comprises:
    an inner liner of plastic material, presenting at each end a terminal portion of thickness that is reduced relative to the thickness of the main portion of said liner, defining a circularly symmetrical inside surface having an inside diameter that is greater than the inside diameter of the main portion of said liner and terminating at a certain distance from the end of said pipe element; and
    a single tubular junction sleeve of material that withstands corrosion, having substantially the same inside diameter as said liner, interposed inside the abutting ends of the two pipe elements so as to overlap said terminal portions of reduced thickness of the two liners, said sleeve presenting, at each of its ends, a respective terminal portion of thickness that is reduced relative to the thickness of the central portion of said sleeve, said terminal portions of the sleeve defining an outside surface of outside diameter that is smaller than the outside diameter of the central portion of the sleeve, and a cylindrical inside surface having substantially the same inside diameter as the inside diameter of the cylindrical inside surfaces of the main portions of the liners and of the central portion of the sleeve;
    wherein:
    the outside surface of each of said terminal portions of reduced thickness of the inner liner is locked by adhesive bonding of the end of the liner at or near said terminal portion of reduced thickness of the liner against the corresponding inside surface of the steel wall of the pipe, using an adhesive;
    said outside surface of each terminal portion of said sleeve is a notched surface enabling it to be inserted in and anchored against the inside surface of the terminal portion of reduced thickness of the corresponding liner, thereby providing a mechanical connection between said outside surface of the sleeve and said inside surface of the liner, merely by forcing said sleeve in the axial longitudinal direction XX' into the inside of said pipe element; and
    the outside diameter of said cylindrical central portion of the sleeve is less than the inside diameter of the non-lined ends of the steel walls of said pipe element so that said sleeve does not come directly into contact with said steel walls, and cooperates therewith and with the ends of the liners on either side of the sleeve to define an annular chamber.

2. A pipe according to claim 1, wherein said sleeve is inserted against the terminal portion of reduced thickness of the liner until the end of the liner comes into abutment against a shoulder defining the boundary between said central portion of the sleeve and said terminal portion of smaller thickness of the sleeve.

3. A pipe according to claim 1, wherein said sleeve is inserted against the terminal portion of reduced thickness of the liner until the end of the sleeve comes into abutment against a shoulder defining the boundary between the main portion and said terminal portion of reduced thickness of the liner.

4. A pipe according to claim 1, wherein the annular chamber is filled with a practically incompressible cross-linkable material or a gel of fixed consistency that is not soluble in water.

5. A pipe according to claim 1, wherein said pipe is suitable for being laid at great depth in the sea, preferably up to 3000 m, and said pipe elements have a length lying in the range 20 m to 50 m.

6. A pipe according to claim 1, wherein said pipe is a pipe for injecting water.

7. A pipe element having an inner liner and suitable for making a pipe according to claim 1, the pipe element having a liner with a terminal portion of reduced thickness at each end, and said tubular junction sleeve as defined in claim 1, said tubular junction sleeve being inserted at only one of its ends and projecting therefrom, the projection of said sleeve defining a male end of said pipe element suitable for being connected to an end that does not have said sleeve and that defines a female end of another said pipe element of the same kind.

8. A method of making a pipe element according to claim 7, wherein the following steps are performed:
    (a) said internal lining is provided by inserting a pipe of flexible and elastic thermoplastic material for forming said liner into a first end of a pipe element, the thermoplastic pipe being circular in section or folded to a kidney shape, and by pulling said thermoplastic pipe in said pipe element to the second end of the pipe element, and then releasing traction so as to enable it to expand radially and become bonded against the inside surface of the wall of said pipe element; and
    (b) cutting away and machining the ends of said liner pipe so as to form said terminal portions of reduced thickness of said liner and a non-lined terminal portion of the steel wall of said pipe element at each of its ends.

9. A method according to claim 8, wherein the outside surface of the thermoplastic liner pipe is coated in adhesive in at least one zone situated outside said pipe element, at least beside said first end of said pipe element and designed to be positioned after release of the traction and after complete shrinkage of said liner pipe, close to or at the terminal portions of reduced thickness of the liner.

10. A method according to claim 9, wherein the outside surface of the thermoplastic liner pipe is coated in adhesive in two zones situated outside said pipe element, beside said first and second ends respectively of said pipe element, and designed to be positioned, after traction has been released and said liner pipe has shrunk fully, close to or at each of said terminal portions of reduced thickness of the liner.

11. A method according to claim 10, wherein, prior to step (a), the inside surface of said second end of the pipe element is coated in an adhesive in a first zone that is designed to be in register with a corresponding first zone of said liner corresponding to the vicinity of or at said terminal portion of reduced thickness of the liner after machining, and the outside surface of the thermoplastic liner pipe is coated in adhesive close to or at a second zone of said liner that is to form said terminal portion of reduced thickness of the liner beside said first end of said pipe element after machining.

12. A method according to claim 9 wherein cold plasma treatment is performed using a device situated outside said pipe element on the zones of the outside surfaces of the thermoplastic liner pipe that are to be coated in adhesive or that are to be pressed against an adhesive-coated zone of the steel wall of a said pipe element, in order to encourage bonding effectiveness.

13. A method according to claim 12, wherein the outside surface of the thermoplastic liner pipe is coated in adhesive in two zones situated outside said pipe element, beside said first and second ends respectively of said pipe element, and designed to be positioned, after traction has been released and said liner pipe has shrunk fully, close to or at each of said terminal portions of reduced thickness of the liner, wherein, prior to step (a), the inside surface of said second end of the pipe element is coated in an adhesive in a first zone that is designed to be in register with a corresponding first zone of said liner corresponding to the vicinity of or at said terminal portion of reduced thickness of the liner after machining, and the outside surface of the thermoplastic liner pipe is coated in adhesive close to or at a second zone of said liner that is to form said terminal portion of reduced thickness of the liner beside said first end of said pipe element after machining, and wherein the outside surface of the thermoplastic liner pipe is treated with a cold plasma firstly in a said first zone of said thermoplastic liner pipe that is to be adhesively-bonded to a said first adhesive-coated zone of the inside surface of the steel wall at said second end of said pipe element, and secondly at a second zone of the outside surface of said thermoplastic liner pipe that is subsequently to be coated in an adhesive, said plasma treatment being performed prior to inserting said thermoplastic liner pipe inside said pipe element.

14. A method according to claim 13, wherein said plasma treatment is performed at said first zone of said flexible liner pipe over a length that is greater than the sum of the shrinkage length of said flexible pipe after traction has been released from said liner pipe, plus the length of said first adhesive-coated zone of the inside surface of the steel wall at said second end of the pipe element, so that said first zones overlap over their full length after traction is stopped and until complete shrinkage of said liner pipe after said traction has been released.

15. A method according to claim 8, wherein, prior to step (a), said thermoplastic liner pipe is heated so as to make it easier to stretch it to a smaller diameter.

16. A method of making a pipe presenting at least two pipe elements having internal lining and assembled end to end, in which the ends of the two pipe elements are welded to each other, each pipe element comprises:

an inner liner of plastic material presenting at each end a terminal portion of thickness that is reduced relative to the thickness of the main portion of said liner, defining a circularly symmetrical inside surface having an inside diameter that is greater than the inside diameter of the main portion of said liner and terminating at a certain distance from the end of said pipe element; and a single tubular junction sleeve of material that withstands corrosion having substantially the same inside diameter as said liner, interposed inside the abutting ends of the two pipe elements so as to overlap said terminal portions of reduced thickness of the two liners, said sleeve presenting, at least each of its ends, a respective terminal portion of thickness that is reduced relative to the thickness of the central portion of said sleeve, said terminal portions of the sleeve defining an outside surface of outside diameter that is smaller than the outside diameter of the central portion of the sleeve, and a cylindrical inside surface having substantially the same inside diameter as the inside diameter of the cylindrical inside surfaces of the main portions of the liners and of the central portion of the sleeve;

wherein:

the outside surface of each of said terminal portions of reduced thickness of the inner liner is locked by adhesive bonding of the end of the liner at or near said terminal portion of reduced thickness of the liner against the corresponding inside surface of the steel wall of the pipe, using an adhesive;

said outside surface of each terminal portion of said sleeve is a notched surface, enabling it to be inserted in and anchored against the inside surface of the terminal portion of reduced thickness of the corresponding liner, thereby providing a mechanical connection between said outside surface of the sleeve and said inside surface of the liner, merely by forcing said sleeve in the axial longitudinal direction XX' into the inside of said pipe element;

the outside diameter of said cylindrical central portion of the sleeve is less than the inside diameter of the non-lined ends of the steel walls of said pipe element so that said sleeve does not come directly into contact with said steel walls, and cooperates therewith and with the ends of the liners on either side of the sleeve to define an annular chamber, said tubular junction sleeve being inserted at only one of its ends and projecting therefrom, the projection of said sleeve defining a male end of said pipe element suitable for being connected to an end that does not have said sleeve and that defines a female end of another said pipe element of the same kind, and wherein the female end without a tubular junction sleeve of a pipe element for assembly is engaged and forced around the male end of the stationary tubular junction sleeve that projects from the terminal pipe element of a pipe that is being assembled, and then the non-lined ends of the steel walls of the two pipe elements are butt-welded together.

17. A method according to claim 16, wherein the annular chamber is filled with a practically incompressible cross-linkable material or a gel of fixed consistency that is not soluble in water and wherein said cross-linkable material or said gel is injected through a hole previously formed through the wall of said sleeve or said steel wall of the pipe, injection taking place via a vacuum chamber fitted in register with said hole, after a vacuum has been established in said annular chamber, and then said vacuum chamber is removed and said hole is plugged.

* * * * *